US010495159B2

(12) United States Patent
Greene et al.

(10) Patent No.: US 10,495,159 B2
(45) Date of Patent: Dec. 3, 2019

(54) ELECTRONICALLY-CONTROLLED SELECTABLE CLUTCH ASSEMBLY WITH CLUTCH MODULE HAVING INTEGRATED SAFETY SWITCH

(71) Applicant: Magna Powertrain, Inc., Concord (CA)

(72) Inventors: Darrell F. Greene, Bradford (CA); Adrian C. Cioc, Richmond Hills (CA); Sean A. Steele, Mississauga (CA); Dennis T. Loui, Richmond Hill (CA); Myron R. Samila, Toronto (CA); David V. Dorigo, Concord (CA)

(73) Assignee: MAGNA POWERTRAIN INC., Concord (CA)

( * ) Notice: Subject to any disclaimer, the term of this patent is extended or adjusted under 35 U.S.C. 154(b) by 82 days.

(21) Appl. No.: 15/562,527

(22) PCT Filed: Apr. 25, 2016

(86) PCT No.: PCT/IB2016/000616
§ 371 (c)(1),
(2) Date: Sep. 28, 2017

(87) PCT Pub. No.: WO2016/170426
PCT Pub. Date: Oct. 27, 2016

(65) Prior Publication Data
US 2018/0355927 A1 Dec. 13, 2018

Related U.S. Application Data

(60) Provisional application No. 62/152,137, filed on Apr. 24, 2015, provisional application No. 62/270,212, filed on Dec. 21, 2015.

(51) Int. Cl.
*F16D 41/14* (2006.01)
*F16D 27/118* (2006.01)
(Continued)

(52) U.S. Cl.
CPC ............. *F16D 41/14* (2013.01); *F16D 27/06* (2013.01); *F16D 27/108* (2013.01);
(Continued)

(58) Field of Classification Search
None
See application file for complete search history.

(56) References Cited

U.S. PATENT DOCUMENTS 3,194,369 A 7/1965 White
7,243,769 B2 * 7/2007 Voelkert ................ F16D 27/06
192/48.2
(Continued)

FOREIGN PATENT DOCUMENTS

CN 1748094 A 3/2006
CN 101210594 A 7/2008
(Continued)

OTHER PUBLICATIONS

Search Report dated Nov. 22, 2018 from corresponding Chinese Patent Application No. 201680031938.7.
(Continued)

*Primary Examiner* — Timothy Hannon
(74) *Attorney, Agent, or Firm* — Dickinson Wright PLLC

(57) ABSTRACT

A clutch assembly includes an outer race presenting a plurality of outer ratchet teeth and an inner race presenting a plurality of outer ratchet teeth. A selectable one-way clutch includes at least one active strut pivotably supported by the outer race and at least one electromagnetic actuator. The electromagnetic actuator is selectively energized for effectuating pivoting of the active strut from an unlocked position wherein the active strut is disengaged from the outer ratchet teeth to a locked position for engaging one of the plurality of outer ratchet teeth during rotation of the inner race. The clutch assembly includes a lead frame assembly attached to
(Continued)

the outer race and electrically connected to the at least one electromagnetic actuator for controlling selective energization of the at least one electromagnetic actuator.

15 Claims, 3 Drawing Sheets

(51) Int. Cl.
*F16D 41/16* (2006.01)
*F16D 27/06* (2006.01)
*F16D 27/108* (2006.01)
*F16D 27/10* (2006.01)
*F16D 41/04* (2006.01)
*F16D 27/00* (2006.01)

(52) U.S. Cl.
CPC ............ *F16D 27/118* (2013.01); *F16D 41/16* (2013.01); *F16D 27/10* (2013.01); *F16D 41/04* (2013.01); *F16D 2027/001* (2013.01)

(56) References Cited

U.S. PATENT DOCUMENTS

| | | |
|---|---|---|
| 2013/0319812 A1 | 12/2013 | Wys et al. |
| 2014/0102844 A1 | 4/2014 | Greene et al. |
| 2015/0001023 A1 | 1/2015 | Kimes et al. |
| 2015/0060225 A1 | 3/2015 | Kimes |
| 2015/0204392 A1 | 7/2015 | Kimes |

FOREIGN PATENT DOCUMENTS

| | | |
|---|---|---|
| CN | 201461803 U | 5/2010 |
| CN | 101764463 A | 6/2010 |
| CN | 103591180 A | 2/2014 |
| CN | 103765028 A | 4/2014 |
| CN | 103807319 A | 5/2014 |
| WO | WO9842996 A1 | 10/1998 |
| WO | WO2009100094 A3 | 10/2009 |
| WO | WO2015030983 A1 | 3/2015 |
| WO | WO2015127546 A1 | 9/2015 |

OTHER PUBLICATIONS

Search Report dated Dec. 14, 2018 from corresponding Chinese Patent Application No. 201680031862.8.

Search Report dated Dec. 17, 2018 from corresponding Chinese Patent Application No. 201680035368.9.

International Search Report and Written Opinion dated Aug. 3, 2016 from International Patent Application Serial No. PCT/IB2016/000616.

* cited by examiner

ELECTRONICALLY-CONTROLLED SELECTABLE CLUTCH ASSEMBLY WITH CLUTCH MODULE HAVING INTEGRATED SAFETY SWITCH

CROSS-REFERENCE TO RELATED APPLICATIONS

This application claims the benefit of U.S. Provisional Application No. 62/152,137 filed Apr. 24, 2015 and U.S. Provisional Application No. 62/270,212 filed Dec. 21, 2015, the entire disclosures of which are incorporated herein by reference.

FIELD OF THE INVENTION

The present disclosure is generally related to overrunning coupling devices such as one-way clutches or brakes and, more specifically to selectable one-way coupling (SOWC) devices having and electromagnetic actuator assembly.

BACKGROUND OF THE INVENTION

This section provides background information related to the present disclosure which is not necessarily prior art.

Automatic transmissions provide a plurality of forward and reverse speed or gear ratios by selectively actuating one or more clutches and/or brakes to establish a torque-transmitting drive connection between a transmission input and a transmission output for supplying motive power (i.e., drive torque) from a powertrain to a driveline in a motor vehicle. One type of brake or clutch widely used in automatic transmission is an overrunning coupling device, commonly referred to as a one-way clutch (OWC), which overruns when one of its races (in radial coupling configuration) or one of its drive plates (in axial coupling configurations) rotates in a first (i.e., freewheel) direction relative to the other race or drive plate, and engages or locks in a second (i.e., lockup) direction. Such conventional one-way clutches provide no independent control over their modes of operation, that is to say whether they lockup or freewheel in both directions and are commonly referred to as passive one-way clutches. Thus, basic one-way clutches provide a "locked" mode in one rotary direction and a "freewheel" mode in the opposite direction based on the direction that the drive torque is being applied to the input race or drive plate.

There are however, requirements in modern automatic transmissions where a "controllable" overrunning coupling device, commonly referred to as a selectable one-way clutch (SOWC), can be selectively controlled to provide additional functional modes of operation. Specifically, a sellable one-way clutch may further be capable of providing a freewheel mode in both rotary directions until a command signal (i.e., from the transmission controller) causes a power-operate actuator to shift the coupling device into its lockup mode. Thus, a selectable one-way clutch may be capable of providing a drive connection between an input member and an output member in one or both rotational directions and it may also be operable to freewheel in one or both directions. It is also known in modern automatic transmissions to integrate a passive one-way clutch and a selectable one-way clutch into a combined coupling device, commonly referred to as a bi-directional clutch.

A need exists to continue development of new and improved overrunning coupling devices that advance the art and provide enhanced functionality.

SUMMARY OF THE INVENTION

A clutch assembly includes an outer race presenting a plurality of inner ratchet teeth and a inner race presenting a plurality of outer ratchet teeth. A selectable one-way clutch includes at least one active strut pivotably supported by the outer race and at least one electromagnetic actuator. The electromagnetic actuator is selectively energized for effectuating pivoting of the active strut from an unlocked position wherein the active strut is disengaged from the outer ratchet teeth to a locked position for engaging one of the plurality of outer ratchet teeth during rotation of the inner race.

The clutch assembly includes a lead frame assembly attached to the outer race and electrically connected to the at least one electromagnetic actuator for controlling the selective energization of the at least one electromagnetic actuator. The integration of the lead frame assembly into the clutch assembly disposes the electronic controls near the electromagnetic actuator which leads to improved packaging and reduce wiring.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENTS

Figure 1:
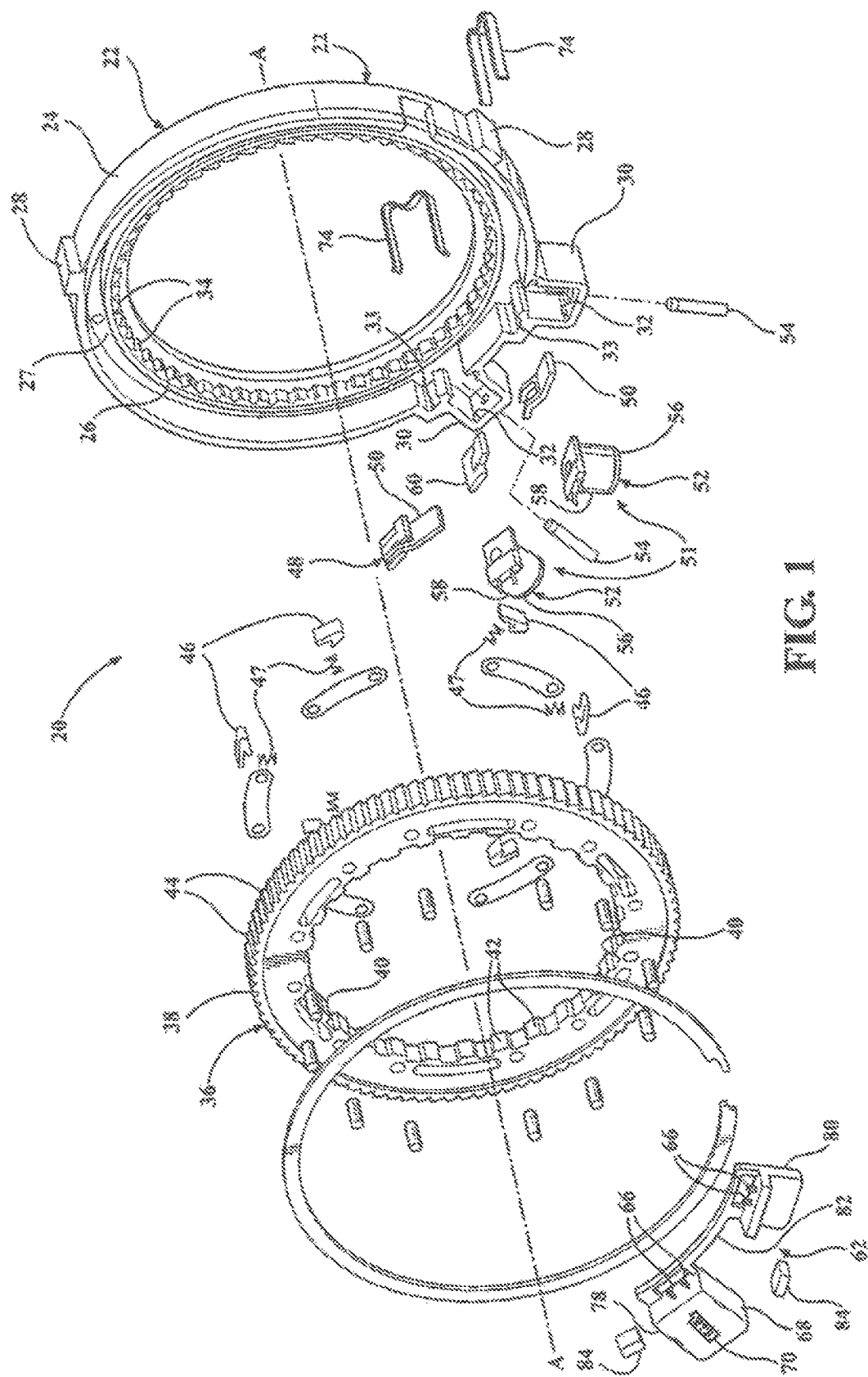
FIG. 1 is an exploded perspective view of a clutch assembly configured to a passive one-way clutch and a selectable one-way clutch having an electromechanical actuator.

Example embodiments will now be described more fully with reference to the accompanying drawings. In general, each embodiment is directed to an overrunning coupling device (i.e., brake and/or clutch) having at least a controllable one-way locking device including a moveable locking component (i.e. sprag, strut, etc.) that is controlled via an electromagnetic actuator. Thus, the electromechanical rocker clutch transmits torque mechanically but is actuated via electrical actuation system. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the several views, a bi-directional clutch assembly 20 is generally shown. As will be detailed, bi-directional clutch assembly 20 generally includes a stationary outer race, a rotatable inner race, a passive one-way clutch having a plurality of passive struts, and a selectable one-way clutch having at least one active strut assembly and an electromagnetic actuator. The clutch assembly 20 includes an outer race 22 that extends annularly about an axis A. The outer race 22 includes an outer ring segment 24 and an inner ring segment 26 that are spaced radially from one another and interconnected via a radial web segment 27. The outer ring segment 24 presents a plurality of outer lugs 28 that extend radially outwardly for mating with a first component. The first component can be a stationary component (such as a housing of a transmission) or a rotary component (such as a shaft). The outer ring segment 24 further presents a pair of protrusions 30 that extend radially outwardly. Each of the protrusions 30 defines a radially extending actuator pocket 32 and a strut pocket 33. It should be appreciated that more or few protrusions 30 could be utilized. The inner ring segment 26 presents a plurality of inner ramp surfaces, hereinafter referred to as inner ratchet teeth 34, that extend radially inwardly and are evenly distributed or spaced from one another about the axis A.

The clutch assembly 20 further includes an inner race 36 that also extends annularly about the axis A. The inner race 36 has an outer rim 38 and a inner rim 40 that are spaced radially from one another. The outer rim 38 is disposed radially between the outer and inner ring segments 24, 26 of the outer race 22, and the inner rim 40 is disposed radially inwardly from the inner ring segment 26 of the outer race 22. The inner 40 of the inner race 36 presents a plurality of inner lugs 42 that extend radially inwardly for mating with a second component (typically a rotary component). Commonly, lugs 42 interconnect a shaft or clutch plates for rotation with inner race 36. Further, the outer rim 38 of the inner race 36 presets a plurality of outer ramp surfaces, hereinafter referred to as outer ratchet teeth 44, that extend radially outwardly and are evenly distributed or spaced from one another about the axis A.

The passive one-way forward clutch includes a plurality of locking elements or passive struts 46 that are pivotally supported in strut apertures formed in the inner race 36 for pivoting between a locking position and an unlocking position. As best shown in FIG. 1, the passive struts are biased towards the locking position by a biasing member 47, such as a spring or the like. In the locking portion, the passive struts 46 engage the inner ratchet teeth 34 of the outer race 22 to define a forward engagement position for connecting the outer and inner races 22, 36 to one another during counter-clockwise rotation of the inner race 36 relative to the outer race 22. Therefore, the forward engagement position established by one or more of the passive struts 46 prevents relative displacement of the outer and inner races 22, 36 in the counter-clockwise direction. However, the passive struts 46 still allow relative displacement, i.e., overrun, in the clockwise direction when located in the locking position since they ratchet over the ramped profile of the inner ratchet teeth 34 and are radially spaced from the inner ratchet teeth 34 of the outer race 22 to establish the unlocking position.

As shown FIG. 1, the selectable one-way reverse clutch includes an active strut assembly 48 received by each of the strut pockets 33 of the outer ring segment 24. Each of the active strut assemblies 48 includes so active strut 50 that is selectively pivotable between a locked and an unlocked position. In the locked position, the active strut 50 lockingly engages the outer ratchet 44 of the inner race 36 during clockwise movement of the inner race 22 relative to the outer race 22 to define a reverse engagement position thereby locking the outer and inner races 22, 36 to one another. However, the active strut 50 still allows relative displacement, i.e., overrun, in the counter-clockwise direction. In the unlocked position, the active strut 50 is radially spaced from the outer ratchet teeth 44, allowing the inner and outer races 22, 36 to rotate relative to one another. Furthermore, as best illustrated in FIG. 1, each of the active strut assemblies 48 includes an armature 60 that is disposed adjacent to the active strut 50 for providing the pivotal movement of the active strut 50.

The selectable one-way reverse clutch also includes at least one electromagnetic actuator 51, each including a coil assembly 52 mounted in the actuator pocket 32 and radially spaced from the active strut 50 and armature 60. The coil assembly 52 includes a core 54 of a magnetically permeable material, a bobbin 56 disposed about the core 54, and a coil 58 wrapped about the bobbin 56. Furthermore, the armature 60 is disposed between the active strut 50 and the coil 58 for pivoting toward the core 54 and thus providing the pivotal movement of the active strut 50 in response to energization of the coil 58.

More specifically, when voltage and/or current are applied to the coil 58, the coil 58 becomes an electromagnet producing an electric field (or flux). The flux flows outwards in all directions and transfers through the small air gap between the armature 60 and core 54 in the center of the coil assembly 52. The core 54 becomes magnetized, therefor attracting the armature 60 towards the core 54. The resulting motion forces the active strut 50 to mechanically deploy due to the linkage between the active strut 50 and the armature 60. On deployment the active strut 50 moves from its unlocked position to its locked position where it locates itself against one of the outer ratchet teeth 44 of the inner race 36 to define the reverse engagement position, effectively locking the inner race 36 from rotating in that direction. Disengagement occurs as voltage and/or current is removed from the coil assembly 52, wherein the armature 60 is demagnetized and free from the coil assembly 52. A biasing spring (not shown) is positioned between the active strut 50 and the outer race 22, causing the active strut 50 to move back to its unlocked position during disengagement.

It should be appreciated that the arrangement of the armature 60, active strut 50, and coil assembly 52 can set to apply a locking force in a radial direction (as shown in FIG. 1) or an axial direction, depending on the layout and/or requirements of the clutch assembly 20. Radial stacked clutch assembly 20 designs offer packaging advantages over their axial counterparts in situations where axial space is tight, e.g., in automatic transmissions. Further, radially applied clutches transmit driving torque directly outwards to be grounded against the transmission housing without the fear of forces being directed axially which could cause problems for the sizing of other system components to compensate for axial force.

Figure 2:
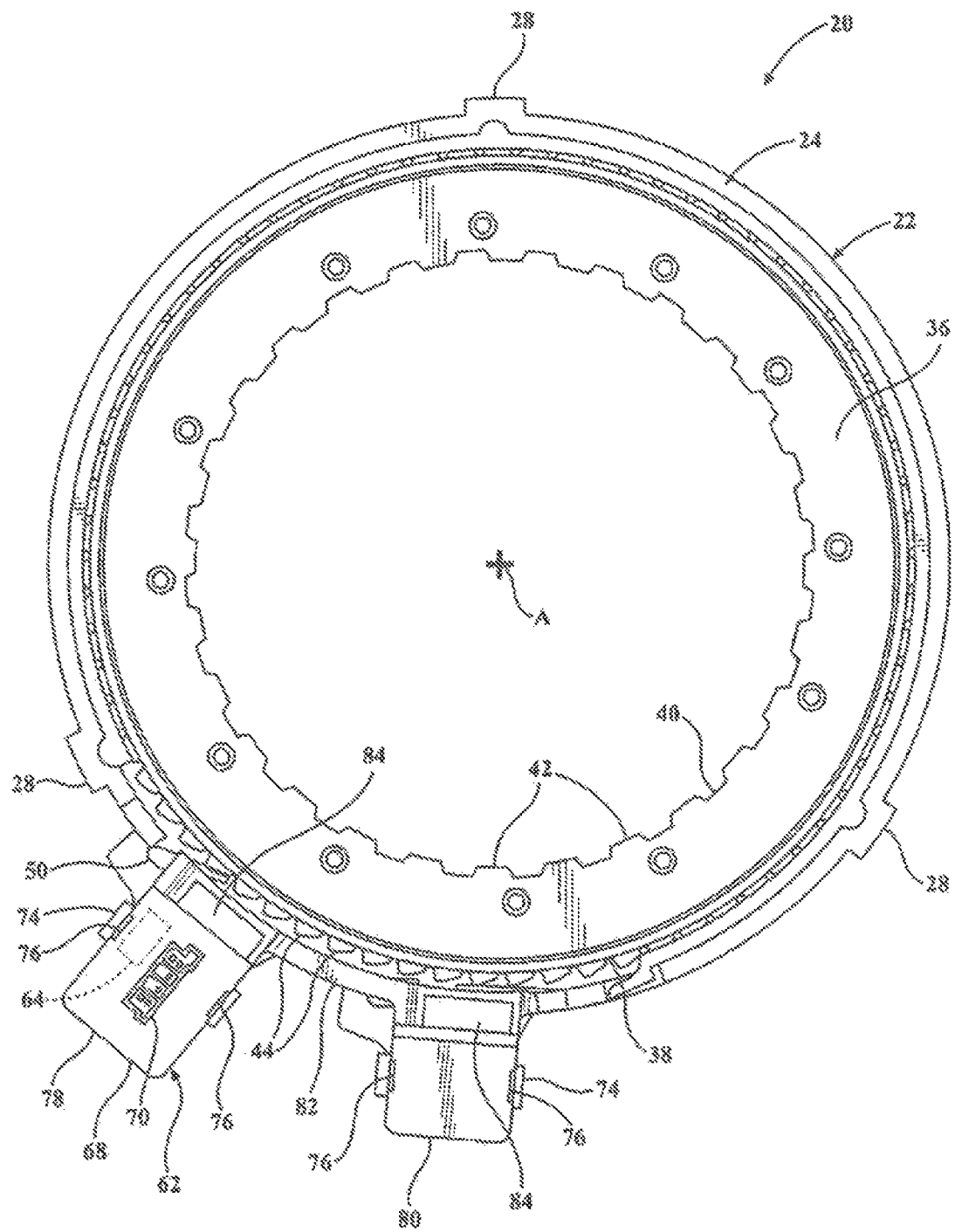
FIG. 2 is an assembled perspective view of the clutch assembly illustrating a lead frame assembly attached to the clutch assembly and electrically connected to an electromagnetic actuator.
Figure 3:
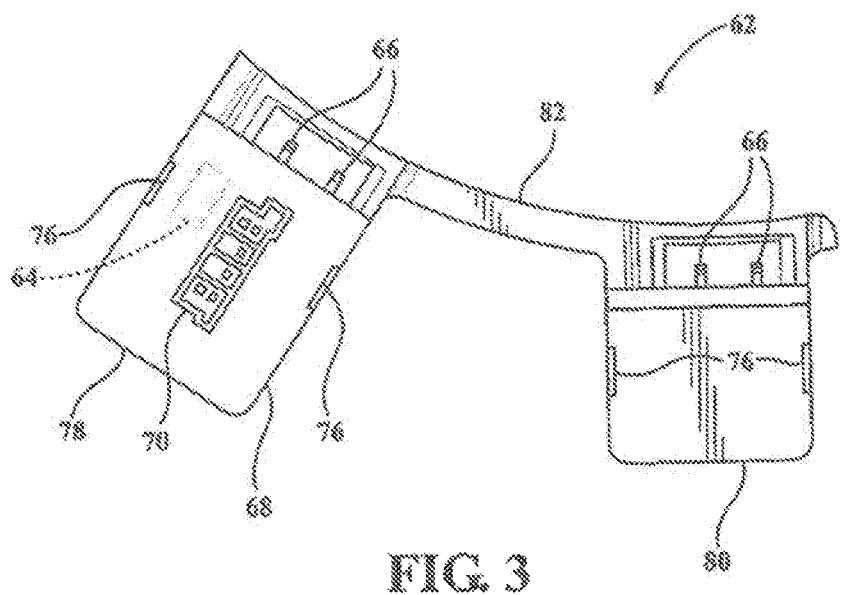
FIG. 3 is a front view of the lead frame assembly of FIGS. 1 and 2.

A lead frame assembly 62 is attached to the outer race 22 and electrically connected to the at least one electromagnetic actuator 51 for controlling the energizing of the coil assemblies 52. As best illustrated in FIGS. 2 and 3, the lead frame assembly 62 includes and integrates a printed circuit board (PCB) 64 for selectively controlling the energization of the at least one electromagnetic actuator 51, and specifically the coils 58 of the coil assemblies 52. In that regard, and as best illustrated to FIG. 3, the lead frame assembly 62 includes at least one set of power output contacts 66 that extend from the lead frame assembly 62 disposed in electrical contact with the coil 58 to provide power to the coil 58. In a presented arrangement, a resistance welded connection is utilized to connect the power output contacts 66 and the coil 58, however, other connections could alternatively be utilized without departing from the scope of the subject disclosure. The lead assembly 62 includes at least one wire which extend between the printed circuit board 64 and each of the power output contacts 66 for electrically connecting the circuit board 64 and the set of power output contacts 66. The selective energization of the coils 58 by way of the printed circuit board 64 effectuates pivotable movement of the active clutch 50 from the unlocked to the locked position for engaging one of the plurality of outer ratchet teeth 44 during rotation of the inner 36.

As best illustrated in FIGS. 1-3, the lead frame assembly 62 includes a casing 68 which encapsulates the printed circuit board 64 to protect the printed circuit board 64 and its associated electrical wiring from an operating environment of the clutch assembly 20. As an example, the casing 68 allows the lead frame assembly 62 to be submerged in automatic transmission fluid and operate in a wide range of temperatures, such as from −40 C to +40 C. In a preferred and non-limiting embodiment, the casing 68 is molded comprised of plastic material, such as Nylon 6/6 or the like, and the printed circuit board 64 is soldered into the lead frame assembly 62 with epoxy acting as a hermetic seal to ATF. As best illustrated FIG. 3, the casing 68 includes a connection interface 70 for establishing an electrical connection between the printed circuit board 64 and an external control module (not expressly shown), such as a transmission control module (TCM) or a powertrain control module (PCM) for allowing data and power to be transmitted the printed circuit board 64.

Figure 4:
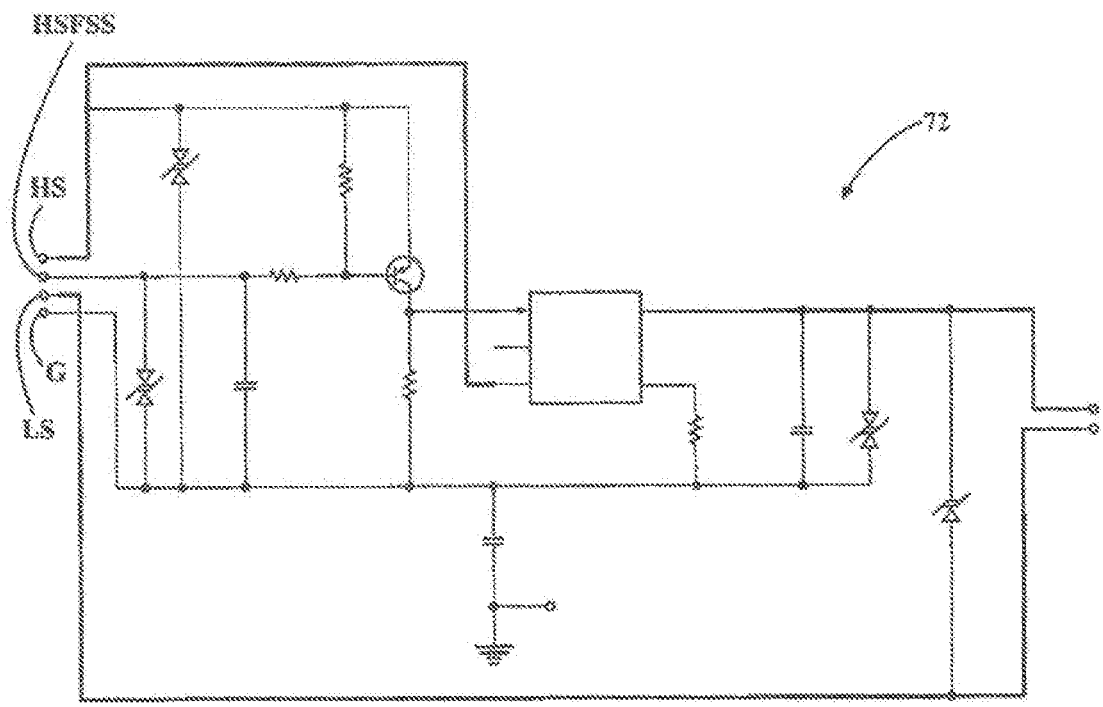
FIG. 4 is an exemplary circuit of a printed circuit board (PCB) integrated into the lead frame assembly.

FIG. 4 illustrates an exemplary embodiment of a circuit 72 that could be utilized with the printed circuit board 64 according to an aspect of the disclosure. With reference to FIG. 4, the voltage applied to the coils 58 via the exiting terminals of the circuit 72 is comprised of a High Side HS and Low Side LS which, in a non-limiting example, is supplied by the TCM or the PCM of a vehicle. The High Side HS is typically a shared power supply with other loads, and the Low Side LS is typically a discrete channel that controls the discrete/individual circuit. The Low Side LS is capable of controlling the amount of current across the coils 58. The circuit 72 also includes a power ground G. A High Side Fall Safe Switch HSFSS is incorporated into the circuit 72 of the printed circuit board 64, and thus integrated into lead frame assembly 62, to add another level of logic in order to control the shared High Side HS supply. The High Side Fall Safe Switch HSFSS is comprised of a High Side Switch, a transistor, and passive components each electrically integrated into the lead frame assembly 62. Thus, it should be appreciated that the configuration of the lead frame assembly 62 protects the integrated electronic components (including the HSFSS) and provides improved packaging and reduced wiring. Additionally, the direct connection of the circuit 72 (including the HSFSS) to the coil assemblies 52 through the lead frame assembly 62 provides a low-cost, modular solution that provides for a more simplified manufacturing process.

As best illustrated in FIG. 3, the lead frame assembly 62 which includes the printed circuit board 64 is attached or connected to the outer race 22 and is disposed next to or adjacent the electromagnetic actuator 51. Specifically, in a non-limiting arrangement the lead frame assembly 62 is disposed in overlaying relationship with and interconnected to the protrusions 30 to cover the actuator pockets 32 and enclose the electromagnetic actuators 51 therein. Accordingly, the circuit board 64 is disposed radially and axially adjacent to each one of the coils 58 of the electromagnetic actuators 51. As best illustrated in FIGS. 1 and 2, a clip 74 is disposed in surrounding relationship with each of the protrusions 30, and the lead frame assembly 62 defines a plurality of detents 76 for receiving the clip 74 and establishing so interlocked relationship between the lead frame assembly 62 and the outer race 22.

In a preferred and non-limiting arrangement, the outer race 22 includes two protrusions 30 which each define an actuator pocket 32 for receiving an electromagnetic actuator 51. The lead frame assembly has a first portion 78 disposed in overlaying relationship with a first of the two actuator pockets 32 and a second portion 80 disposed in overlaying relationship with a second of the two actuator pockets 32. The lead frame assembly also includes a first set of power output contacts 66 disposed in electrical contact with a first coil assembly 52 and a second set of power output contacts 66 disposed in electrical contact with a second coil assembly 52. The lead frame assembly has a bridge portion 82 which interconnects the first portion 78 and the second portion 80 and includes a wire extending therethrough to establish electrical connection of the first and second coil assemblies 52 of the electromagnetic actuators 51 to another in series or in parallel. As best illustrated in FIG. 2, a terminal cap 84 is interconnected to each set of power output contacts 66 to shield each power output contact 66 within the first and second sets of power contacts 66 from one another. Although the clutch assembly 20 is illustrated and described with respect to a pair of electromagnetic actuators 51, it should be appreciated that the lead frame assembly 62 could connect any number of coils assemblies 52 in series, and that any number of power contacts 66 could be utilized to power any number of coils 58.

It should be appreciated that the foregoing description of the embodiments has been provided for purposes of illustration and the modular configuration of the lead frame assembly 62 and associate components could be utilized on other clutch assembly configurations, e.g., axially engaging clutch assemblies. In other words, the subject disclose it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may else be varies in many ways. Such variations are not to be regarded as a departure from the disclosure, and all such modifications are intended to be included within the scope of disclosure.

What is claimed:
1. A clutch assembly comprising:
an outer race presenting a plurality of inner ratchet teeth;
an inner race presenting a plurality of outer ratchet teeth;
a selectable one-way clutch including at least one active strut pivotably supported by said outer race and at least one electromagnetic actuator supported by said outer race for selectively pivoting said at least one active strut from an unlocked position wherein said active strut is disengaged from said outer ratchet teeth to a locked position for engaging one of said plurality of outer ratchet teeth during rotation of said inner race;
a lead frame assembly attached to said outer race and electrically connected to said at least one electromag- netic actuator for controlling energization of said at least one electromagnetic actuator;

said outer race defining at least one actuator pocket, said at least one electromagnetic actuator disposed within said at least one actuator pocket, and said lead frame assembly disposed in overlaying relationship with said at least one actuator pocket to enclose said at least one electromagnetic actuator within said at least one actuator pocket.

2. The clutch assembly as set forth in claim 1 wherein said lead frame assembly includes an integrated printed circuit board (PCB) for selectively controlling the energization of said at least one electromagnetic actuator.

3. The clutch assembly as set forth in claim 2 wherein said integrated printed circuit board includes a fail safe switch.

4. The clutch assembly as set forth in claim 2 wherein said lead frame assembly includes a casing to encapsulate said integrated PCB.

5. The clutch assembly as set forth in claim 4 wherein said casing is made of a molded plastic material and wherein said integrated PCB is soldered into the molded casing.

6. The clutch assembly as set forth in claim 4 wherein said casing of said lead frame assembly includes a connection interface to establish an electrical connection to an external control module for receiving data and power at said integrated PCB.

7. The assembly as set forth in claim 1 wherein said at least one electromagnetic actuator includes a coil assembly and said lead frame includes at least one power output contact disposed in electrical contact with said coil assembly.

8. A clutch assembly comprising:
an outer race presenting a plurality of inner ratchet teeth;
an inner race presenting a plurality of outer ratchet teeth;
a selectable one-way clutch including at least one active strut pivotably supported by said outer race and at least one electromagnetic actuator supported by said outer race for selectively pivoting said at least one active strut from an unlocked position wherein said active strut is disengaged from said outer ratchet teeth to a locked position for engaging one of said plurality of outer ratchet teeth during rotation of said inner race;
a lead frame assembly attached to said outer race and electrically connected to said at least one electromagnetic actuator for controlling energization of said at least one electromagnetic actuator;
said outer race including at least one protrusion which defines at least one actuator pocket;
said at least one electromagnetic actuator disposed within said at least one actuator pocket; and
said lead frame assembly disposed in overlaying relationship with said at least one protrusion to enclose said electromagnetic actuator within said at least one actuator pocket.

9. The clutch assembly as set forth in claim 8 wherein said lead frame assembly is connected to said at least one protrusion of said outer race.

10. The clutch assembly as set forth to claim 9 further comprising a clip disposed in surrounding relationship with said at least one protrusion and interlocked to said lead frame assembly to interconnect said lead frame assembly to said outer race.

11. The clutch assembly as set forth in claim 10 wherein said lead frame assembly defines a plurality of detents for receiving said clip to establish said interlocked relationship.

12. The clutch assembly as set forth in claim 8 wherein said at least one protrusion includes a plurality of protrusions, wherein said at least one actuator pocket includes a plurality of actuator pockets, wherein said plurality of protrusions each defines one of said actuator pockets, wherein said at least one electromagnetic actuator includes a plurality of electromagnetic actuators each disposed within a respective one of said actuator pockets, and said lead frame assembly is disposed in overlaying relationship with each of said plurality of protrusions to enclose said plurality of electromagnetic actuators within said plurality of actuator pockets.

13. The clutch assembly as set forth in claim 12 wherein each of said plurality of electromagnetic actuators includes a coil assembly to define a plurality of coil assemblies, and said lead frame assembly includes a plurality of power output contacts each disposed in electrical contact with one of said coil assemblies to electrically connect said coil assemblies to one another in series or in parallel.

14. The clutch assembly as set forth in claim 13 further comprising:
wherein said plurality of actuator pockets includes a first actuator pocket and a second actuator pocket,
wherein said plurality of electromagnetic actuators includes two electromagnetic actuators each disposed within a respective one of said first and second actuator pockets,
said lead frame assembly having a first portion disposed in overlaying relationship with said first actuator pocket and including a first set of power output contacts disposed in electrical contact with a first coil assembly,
said lead frame assembly having a second portion disposed in overlaying relationship with said second actuator pocket and including a second set of power output contacts disposed in electrical contact with a second coil assembly, and
said lead frame assembly having a bridge portion interconnecting said first portion and said second portion to establish said electrical connection of said first and second coil assemblies to one another in series.

15. The clutch assembly as set forth in claim 14 further comprising:
a terminal cap connected to each set of power output contacts to shield each power output contact within said first and second sets of power contacts from one another.

* * * * *